ured by a particular formula and a particular $d_{001}$
United States Patent
Jaffe

[15] 3,664,973
[45] May 23, 1972

[54] HYDROTHERMAL METHOD FOR MANUFACTURING A NOVEL CATALYTIC MATERIAL, CATALYSTS CONTAINING SAID MATERIAL, AND PROCESSES USING SAID CATALYSTS

[72] Inventor: Joseph Jaffe, Berkeley, Calif.
[73] Assignee: Chevron Research Company, San Francisco, Calif.
[22] Filed: May 20, 1970
[21] Appl. No.: 39,518

Related U.S. Application Data

[63] Continuation-in-part of Ser. No. 763,922, Sept. 30, 1968.

[52] U.S. Cl. ..........................252/455 R, 23/113, 252/442
[51] Int. Cl. .....................................B01j 11/40, C01b 38/28
[58] Field of Search...........................252/451, 442, 455 R

[56] References Cited

UNITED STATES PATENTS

| | | | |
|---|---|---|---|
| 3,252,757 | 5/1966 | Granquist | 252/455 X |
| 3,535,228 | 10/1970 | Csicsery et al. | 252/455 X |
| 3,546,094 | 12/1970 | Jaffe | 252/455 X |
| 3,140,253 | 7/1964 | Plank et al. | 252/455 X |
| 2,914,464 | 11/1959 | Burton et al. | 208/111 X |

*Primary Examiner*—C. F. Dees
*Attorney*—A. L. Snow, Frank E. Johnston, George F. Magdeburger, Charles J. Tonkin and Roy H. Davies

[57] ABSTRACT

(a) A synthetic layer-type, crystalline, clay-like mineral characterized by a particular formula and a particular $d_{001}$ spacing; (b) the method of preparing a hydrocarbon conversion catalyst cracking component which comprises dehydrating said mineral; (c) the catalyst cracking component so prepared.

17 Claims, No Drawings

HYDROTHERMAL METHOD FOR MANUFACTURING A NOVEL CATALYTIC MATERIAL, CATALYSTS CONTAINING SAID MATERIAL, AND PROCESSES USING SAID CATALYSTS

RELATED APPLICATION

This application is a continuation-in-part of application, Ser. No. 763,922, filed Sept. 30, 1968.

INTRODUCTION

This application relates to a novel synthetic layered crystalline clay-type aluminosilicate mineral, to a method of preparing a hydrocarbon conversion catalyst cracking component from said mineral, and to the catalyst cracking component so prepared.

PRIOR ART

It is known, particularly from Granquist U.S. Pat. No. 3,252,757, that a relatively new layered crystalline aluminosilicate clay-type mineral that has been synthesized has the empirical formula $$nSiO_2 : Al_2O_3 : mAB : xH_2O$$

where the layer lattices comprise said silica, said alumina, and said B, and where $n$ is from 2.4 to 3.0
$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50 percent relative humidity, said mineral being characterized by a $d_{001}$ spacing at said humidity within the range which extends from a lower limit of about 10.4 Angstroms to an upper limit of about 12.0 Angstroms when A is monovalent, to about 14.7 Angstroms when A is divalent, and to a value intermediate between 12.0 Angstroms and 14.7 Angstroms when A includes both monovalent and divalent cations. The equivalent of an exchangeable cation, A, in said mineral, may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said synthetic layered crystalline aluminosilicate mineral of said Granquist patent is known from U.S. Pat. No. 3,252,889 to have application in calcined form as a component of a catalytic cracking catalyst, and applications of said layered aluminosilicate in calcined form as a component of a hydrocracking catalyst have been disclosed in copending applications, Ser. Nos. 760,619 and 750,038.

Said layered mineral of said Granquist patent is a randomly interstratified montmorillonite-mica, that is, one containing randomly alternating montmorillonite and mica layers. It expands upon glycerol treatment, and irreversibly collapses to a mineralogically different mineral species upon calcination.

OBJECTS

In view of the foregoing, it is an object of the present invention to provide a novel mineral of improved characteristics, compared with the mineral of said Granquist patent, particularly for use as a component of a hydrocarbon conversion catalyst, to provide a method for making a hydrocarbon conversion catalyst cracking component from said mineral, and to provide catalysts so prepared.

STATEMENT OF INVENTION

In accordance with the method of the present invention, there is provided a synthetic layer-type, crystalline, clay-like mineral having the empirical formula

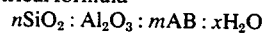

where the layer lattices comprise said silica, said alumina, and said B, and where $n$ is from 0.4 to 15.0
$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50 percent relative humidity, said mineral being characterized by a $d_{001}$ spacing at said humidity which is above 10.25 Angstroms and below 10.4 Angstroms when A is monovalent. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Said mineral may be prepared by subjecting a hydrogel or hydrogel slurry comprising water, a component selected from fluorine and compounds of fluorine, and an amorphous cogel starting material comprising silica and alumina, said cogel starting material preferably having a silica/alumina molar ratio above 3.3 and preferably being present in said hydrogel or hydrogel slurry in an amount of 5 to 50 weight percent, preferably 5 to 25 weight percent, preferably at a pH of 6 to 10, in a conversion zone to conditions of elevated temperature and pressure, until a substantial amount of crystalline aluminosilicate mineral is formed, preferably in intimate admixture with a substantial amount of unreacted cogel comprising silica and alumina. Preferably the elevated temperature is in the range 340° to 700° F. After the desired quantity of synthetic crystalline aluminosilicate mineral forms, said resulting slurry comprising said mineral, preferably also comprising unconverted amorphous gel, is dried, to produce a catalytic material comprising said mineral, said catalytic material being useful as a catalytic cracking catalyst or cracking component of a catalyst containing at least one additional component. The desired quantity of crystalline mineral formed preferably is that quantity which will result in 5 to 95 weight percent, preferably 20 to 70 weight percent, thereof in the final dried catalytic material. Said material, when it comprises said crystalline mineral in intimate admixture with unreacted amorphous silica-alumina cogel, will have a surface area of 200 to 380 $M^2/g$. Said material, prior to or after calcining, may be impregnated with at least one catalytic hydrogenating component precursor to form a hydroprocessing catalyst. Said material may be calcined and used as such a catalytic cracking catalyst, or combined with other catalytic cracking components.

The synthetic layered crystalline clay-type aluminosilicate mineral of the present invention, that is formed by crystallization during the process of the present invention, preferably has a silica/alumina ratio above 3.0. When that mineral, or the catalytic material referred to herein comprising said mineral and unreacted amorphous cogel, is dried and calcined, the $d_{001}$ spacing of said mineral may be different than it was prior to drying and calcining. However, in its preferred high silica/alumina ratio form, said mineral, prior to drying and calcining, has the following formula: $nSiO_2 : Al_2O_3 : mAB : xH_2O$, where the layer lattices comprise said silica, said alumina, and said B, and where $n$ is more than 3.0
$m$ is from 0.2 to 0.6

A is one equivalent of an exchangeable cation having a valence not greater than 2, and is external to the lattice, B is chosen from the group of negative ions which consists of $F^-$, $OH^-$, $\frac{1}{2}O^{--}$ and mixtures thereof, and is internal in the lattice, and $x$ is from 2.0 to 3.5 at 50 percent relative humidity, said mineral being characterized by a $d_{001}$ spacing at said humidity which is above 10.25 Angstroms and below 10.4 Angstroms when A is monovalent. The equivalent of an exchangeable cation, A, in said mineral may be chosen from the group consisting of $H^+$, $NH_4^+$, $Li^+$, $K^+$, $\frac{1}{2}Ca^{++}$, $\frac{1}{2}Mg^{++}$, $\frac{1}{2}Sr^{++}$, and $\frac{1}{2}Ba^{++}$, and mixtures thereof.

Preferably the hydrogel or hydrogel slurry is washed with dilute ammonium acetate and water before being subjected to the elevated temperature and pressure treatment of the process of the present invention.

The hydrogel or hydrogel slurry may be prepared in any convenient manner, using suitable precursor compounds of the final components of the desired catalyst, preferably using silicon and aluminum compounds in amounts that will result in the gel portion of the slurry having a silica/alumina molar ratio above 3.3. A suitable general procedure for forming the hydrogel or hydrogel slurry may be found in Joseph Jaffe U.S. Pat. No. 3,280,040. Aluminum-containing precursor compounds preferably are chlorides. Suitable silicon-containing precursor compounds are alkali metal silicates.

Said catalytic hydrogenating component precursor compound is selected from compounds of nickel, cobalt, platinum, palladium and rhenium. In addition to impregnation with said precursor compound, said material comprising said mineral advantageously may be impregnated with at least one catalytic hydrogenating component precursor compound selected from compounds of tungsten, molybdenum, tin and zinc.

Any one or more of the elements contained in the aforementioned catalytic hydrogenating component precursors may be present in a desired final hydroprocessing catalyst, in the form of metals, oxides, sulfides or any combination thereof, in amounts selected from the following list, based on the total catalyst, calculated as metals:

| Element  | Weight Percent |
|----------|----------------|
| Ni or Co | 1–20           |
| Pt or Pd | 0.01–2.0       |
| Re       | 0.01–2.0       |
| W or Mo  | 5–35           |
| Sn or Zn | 0.1–10         |

It has been found that the presence of tin, in the metal, oxide or sulfide form, particularly in combination with nickel, in a hydroprocessing catalyst according to the present invention, results in higher hydrocracking activity and higher hydrogenation activity than would be exhibited by a catalyst that is identical except that contains no tin. Further, the presence of tin permits the hydrogenation activity to be controlled in an essentially reversible manner by varying the amount of sulfur present in the feed.

Particularly effective hydrogenating components and combinations of catalytic hydrogenating components in the final catalyst, in the form of metals, oxides or sulfides, are:

| Ni or Co | NiMo or CoMo | NiSn | PtRe  |
|----------|--------------|------|-------|
| Pt or Pd | NiW or CoW   | MoZn | PdRe  |
| Re       |              |      |       |

Said hydrogel or hydrogel slurry additionally may contain precursor compounds of an oxide selected from titania, zirconia, hafnia, thoria and ceria; any one or more of these oxides may be present in the final catalyst in an amount of 0 to 30 weight percent.

Said hydrogel or hydrogel slurry should contain fluorine or a compound of fluorine, in an amount which will provide fluorine or a compound of fluorine in the final catalyst cracking component material in an amount of 0.1–3 weight percent, preferably 0.5–3 weight percent, more preferably 0.5–2 weight percent, calculated as F.

Because the suitable hydrothermal conversion temperatures for forming the desired synthetic crystalline mineral from precursors thereof lie far above the normal boiling point of water, the hydrogel or hydrogel slurry conveniently is subjected to said conditions at elevated temperature and pressure in a pressure vessel, so that the water contained therein will remain in the liquid state by autoclave action. The hydrogel or hydrogel slurry is maintained at the selected temperature and pressure for a sufficient period of time for the formation of the desired crystalline aluminosilicate to the desired extent. Preferred temperatures are 340° to 700° F., at pressures above 500 p.s.i.g., preferably above 900 p.s.i.g. The temperatures at which the formation of the desired crystalline aluminosilicate takes place is in the practical range 530° to 700° F., with about 545° F. being optimum. The optimum temperature does not vary greatly with the presence in the hydrogel or hydrogel slurry of such final optional catalyst components as titania and zirconia. The pressure need not be appreciably in excess of the autoclave pressure of the hydrogel or hydrogel slurry, i.e., that developed by the vapor pressure of the water itself. The latter is only negligibly changed by the dissolved material in the hydrogel or hydrogel slurry, because the bulk of the solids therein is not in a form which appreciably changes the vapor pressure. Therefore, the ordinary tabulations of steam pressure may be used. Accordingly, at 545° F. the pressure developed is around 1,000 p.s.i.g.

The reaction time may vary from 0.1 to 100 hours, depending upon the reaction temperature, pressure and degree of conversion of the hydrogel or hydrogel slurry to said clay-type aluminosilicate that is desired. With lower reaction temperatures longer reaction times are required for a given degree of conversion, and vice versa. Preferably a reaction time of 0.2 to 5 hours, more preferably 0.2 to 2 hours, is used.

When the hydrogel or hydrogel slurry has remained at the selected conditions of temperature and pressure for a sufficient time for the desired amount of the desired crystalline aluminosilicate to form, the mixture is allowed to cool, and the slurry containing said crystalline aluminosilicate is dried, for example at 200°–450° F. Thereafter, the dried material may be calcined for use as a catalytic cracking catalyst, or may be combined prior to or after calcining with any desired hydrogenation component or components to produce a hydroprocessing catalyst. When a hydroprocessing catalyst is so produced, it preferably is activated in an oxygen-containing gas stream, which may be air, at a temperature of 900° to 1,150° F. for 0.5 to 20 hours, to produce the final solid catalyst. It has been found that optimum activity is developed in the catalyst if the activation temperature does not exceed 1,150° F.

The hydroprocessing catalyst produced as described above may be used in such reactions as hydrofining and hydrocracking. Those skilled in the art will recognize which catalytic components the catalyst should contain for the particular reaction for which the catalyst will be used, and will be aware of the operating conditions at which the reaction should be conducted.

As an alternative to using the novel catalytic material produced as described above, in the manner described above, said material may be broken into particles, for example pulverized into a powder, and said particles may be dispersed in a hydrogel or hydrogel slurry comprising components selected from precursor compounds of alumina, silica, silica-alumina, silica-alumina-titania, and silica-alumina-zirconia, and the resulting mixture may be dried and activated, at the same conditions used for drying and activating the material of said particles, to form a catalyst composite material. The hydrogel or hydrogel slurry in which said particles are dispersed may contain any or all of the components of the hydrogel or hydrogel slurry used in making said particles, or may contain any components that the foregoing discussion indicates could have been contained in the hydrogel or hydrogel slurry used in making said particles. Additionally, the hydrogel or hydrogel slurry in which said particles are dispersed may contain particles of crystalline zeolitic molecular sieve, preferably 'X' or 'Y' type. Said molecular sieve desirably may be an ultra-stable molecular sieve, that is, one having a sodium content below 3 weight percent, calculated as $Na_2O$, a unit cell size below about 24.65 Angstroms, and a silica/alumina ratio above about 2.15.

EXAMPLES

The following examples will aid in understanding the catalyst preparation method of the present invention, and use of the catalyst prepared thereby.

EXAMPLE 1

A novel catalytic material, comprising a novel synthetic layered crystalline material in an intimate admixture with unreacted silica-alumina cogel, said material being useful as a catalytic cracking catalyst or a cracking component of a catalyst containing at least one additional component, is prepared from an amorphous cogelled precursor material of the following composition:

| Component | Wt.% of Total Cogelled Material, Anhydrous Basis | Weight Ratio | Molar Ratio |
|---|---|---|---|
| $SiO_2$ | 67 | $\frac{2.03}{1}$ | $\frac{3.45}{1}$ |
| $Al_2O_3$ | 33 | | |

The amorphous cogelled precursor material is prepared by the following steps, using sufficient quantities of the starting materials to produce the above-indicated weight percentages of the components of said cogelled precursor material.

1. An aqueous acidic solution is prepared, containing $AlCl_3$ and acetic acid.
2. A dilute sodium silicate solution is added to said acidic solution to form a clear dispersion of colloidal silica in $AlCl_3$ and acetic acid.
3. An ammonium hydroxide solution is added to said clear dispersion to precipitate alumina and silica in the form of a hydrogel slurry, at a pH of 7–8.
4. Ammonium bifluoride is added to said hydrogel slurry, in an amount sufficient to provide 0.1 to 3 weight percent fluoride in said hydrogel slurry, calculated as F, based on the silica and alumina in said hydrogel slurry. Instead of ammonium bifluoride, sodium fluoride or HF may be used in preparation of the material of the present invention.
5. The slurry is filtered to produce a hydrogel filter cake. The filter cake is partially dried to about 25 percent solids content and is extruded into small pellets. The pellets are washed repeatedly with dilute ammonium acetate solution to remove sodium and chloride ionic impurities.

A slurry is formed from the washed hydrogel pellets and water, using sufficient water to provide a slurry solids content of 10 weight percent. The slurry is loaded into an autoclave and there is aged for 0.5 to 2 hours at 1,400 p.s.i.g. autogenous pressure (300° C.), resulting in a slurry containing a crystallized mineral, fluorine, and unreacted amorphous cogel, all in intimate admixture.

The autoclaved slurry is dried. X-ray diffraction and other examinations of the resulting material indicate the presence of unreacted amorphous cogel, fluorine, and a synthetic layered crystalline clay-type aluminosilicate, consisting predominantly of mica-like layers and having a $d_{001}$ spacing of about 10.36 Angstroms, all in intimate admixture. Upon treatment with glycerol the material does not swell, as does said Granquist synthetic aluminosilicate material.

EXAMPLE 2

A portion of the material of Example 1 is calcined and used as a catalytic cracking catalyst.

EXAMPLE 3

Another portion of the material of Example 1 is pulverized, moistened with a solution of palladium ammino nitrate and chromium nitrate, extruded into ⅛ inch-diameter pellets, dried and calcined to form a hydrocracking catalyst containing 0.5 weight percent palladium and 0.5 weight percent chromium. Said catalyst is used to hydrocrack a hydrofined California gas oil of the following description:

| | |
|---|---|
| Gravity, °API | 34 |
| Aniline point, °F. | 193 |
| Organic nitrogen, p.p.m. | 0.1 |
| Boiling range, °F. | 550–850 |

The hydrocracking conditions are as follows:

| | |
|---|---|
| Liquid hourly space velocity, V/V/hr. | 2.0 |
| Per-pass conversion to products boiling below 400°F., vol.% | 60 |
| Exit gas rate, SCF/bbl. | 5600 |
| Total pressure, p.s.i.g. | 1200 |

The starting temperature necessary to achieve the indicated per-pass conversion is 580° F. The catalyst fouling rate is 0.025° F. per hour.

What is claimed is:

1. A synthetic layer-type, crystalline, clay-like mineral having the empirical formula:

$$nSiO_2 : Al_2O_3 : mAB : xH_2O$$

where the layer lattices comprise said silica, said alumina, and said B, and where $n$ is from 0.4 to 15.0

$m$ is from 0.2 to 0.6

A is one equivalent of an exchangeable cation having a valence not greater than 2, and is external to the lattice, B is chosen from the group of negative ions which consists of $F^-$, $OH^-$, $½O^{--}$, and mixtures thereof, and is internal in the lattice, and $x$ is from 2.0 to 3.5 at 50 percent relative humidity, said mineral being characterized by a $d_{001}$ spacing at said humidity which is above 10.25 Angstroms and below 10.4 Angstroms when A is monovalent.

2. A mineral as in claim 1, wherein $n$ is from 2.0 to 4.0.

3. A mineral as in claim 2, wherein $n$ is greater than 3.0.

4. A mineral as in claim 1, wherein said $d_{001}$ spacing is about 10.36 Angstroms.

5. A mineral as in claim 1, in intimate admixture with an amorphous silica-alumina gel.

6. A mineral as in claim 1, in intimate admixture with a hydrogenating component precursor selected from compounds of Group VI metals and compounds of Group VIII metals.

7. A mixture as in claim 5, in further intimate admixture with a hydrogenating component precursor selected from compounds of Group VI metals and compounds of Group VIII metals.

8. A hydrocarbon conversion catalyst cracking component material obtained by the dehydration of a synthetic layer-type, crystalline, clay-like mineral having the empirical formula:

$$nSiO_2 : Al_2O_3 : mAB : xH_2O$$

where the layer lattices comprise said silica, said alumina, and said B, and where $n$ is from 0.4 to 15.0

$m$ is from 0.2 to 0.6

A is one equivalent of an exchangeable cation selected from the group consisting of hydrogen, ammonium, alkali metal, and alkaline earth metal ions, and mixtures thereof, and is external to the lattice;

B is one equivalent of an anion selected from the group consisting of fluoride, hydroxyl, and oxygen ions, and mixtures thereof, and is internal in the lattice, and $x$ is from 2.0 to 3.5 at 50 percent relative humidity, said mineral being characterized by a $d_{001}$ spacing at said humidity which is above 10.25 Angstroms and below 10.4 Angstroms when A is monovalent.

9. A catalyst component material as in claim 8, characterized by a $d_{001}$ spacing of about 10.36 Angstroms at 50 percent relative humidity when A is monovalent.

10. A catalyst component material as in claim 9, in intimate admixture with an amorphous silica-alumina gel.

11. A material as in claim 9, in intimate admixture with a hydrogenating component precursor selected from compounds of Group VI metals and compounds of Group VIII metals.

12. A material as in claim 10, in further intimate admixture with a hydrogenating component precursor selected from compounds of Group VI metals and compounds of Group VIII metals.

13. A process of preparing a catalytic component material which comprises dehydrating a synthetic layer-type, clay-like, crystalline mineral having the empirical formula:

$nSiO_2 : Al_2O_3 : mAB : xH_2O$ where the layer lattices comprise said silica, said alumina, and said B, and where $n$ is from 0.4 to 15.0
$m$ is from 0.2 to 0.6

A is one equivalent of an exchangeable cation selected from the group consisting of hydrogen, ammonium, alkali metal, and alkaline earth metal ions, and mixtures thereof, and is external to the lattice;

B is one equivalent of an anion selected from the group consisting of fluoride, hydroxyl, and oxygen ions, and mixtures thereof, and is internal in the lattice, and $x$ is from 2.0 to 3.5 at 50 percent relative humidity,
said mineral being characterized by a $d_{001}$ spacing at said humidity which is above 10.25 Angstroms and below 10.4 Angstroms when A is monovalent.

14. The process of claim 13, wherein said dehydration is conducted at a temperature in the range 600° to 1,450° F.

15. The process as in claim 13, wherein said material being dehydrated is in intimate admixture with an amorphous silica-alumina gel.

16. The process as in claim 13, wherein said material being dehydrated is in intimate admixture with a hydrogenating component precursor selected from compounds of Group VI metals and compounds of Group VIII metals.

17. The process as in claim 15, wherein said material being dehydrated is in further intimate admixture with a hydrogenating component precursor selected from compounds of Group VI metals and compounds of Group VIII metals.

* * * * *